United States Patent [19]

Nakulski et al.

[11] Patent Number: 5,238,177

[45] Date of Patent: Aug. 24, 1993

[54] METHOD AND APPARATUS FOR FORMING CONVEYOR BELT HINGE PINS

[75] Inventors: William L. Nakulski, Roselle; Thomas J. Bubula, Beecher; Richard J. Behrends, Wauconda, all of Ill.

[73] Assignee: Flexible Steel Lacing Company, Downers Grove, Ill.

[21] Appl. No.: 927,803

[22] Filed: Aug. 10, 1992

[51] Int. Cl.⁵ .................................. B23K 13/01
[52] U.S. Cl. ........................ 228/265; 219/7.5; 219/68; 225/2
[58] Field of Search .............. 225/2, 935, 102; 219/68, 7.5, 50; 228/265; 29/825

[56] References Cited

U.S. PATENT DOCUMENTS

| | | | |
|---|---|---|---|
| 1,933,444 | 10/1933 | Moreira | 219/50 X |
| 2,009,206 | 7/1935 | Rosner | 219/50 |
| 2,264,817 | 12/1941 | Uhler | 219/50 |
| 2,507,817 | 5/1950 | Ropp et al. | 225/2 X |
| 2,606,266 | 8/1952 | Duch et al. | 225/2 X |
| 4,023,239 | 5/1977 | Stolz | 16/386 X |
| 4,836,006 | 6/1989 | Brown | 225/102 X |

*Primary Examiner*—Kenneth J. Ramsey
*Attorney, Agent, or Firm*—Fitch, Even, Tabin & Flannery

[57] ABSTRACT

Disclosed is a flexible hinge pin, and a method and apparatus for forming the hinge pin, wherein a cable is twisted and heated with sufficient torque and heat to sever the cable into shorter hinge pins. The heating and twisting causes the portions of the cable in proximity with the severed ends to have a tight spiral and to be reduced in diameter, and the strands which comprise the cable to be bonded to one another both internally and at external portions of the cable. The reduced diameters of the formed ends facilitates easier threading of the hinge pins through belt fastener hoops. The bonding of the cable strands in the region of the ends serves to both maintain the tight spiral and the reduced diameter, and to prevent the ends of the hinge pin from separating.

14 Claims, 5 Drawing Sheets

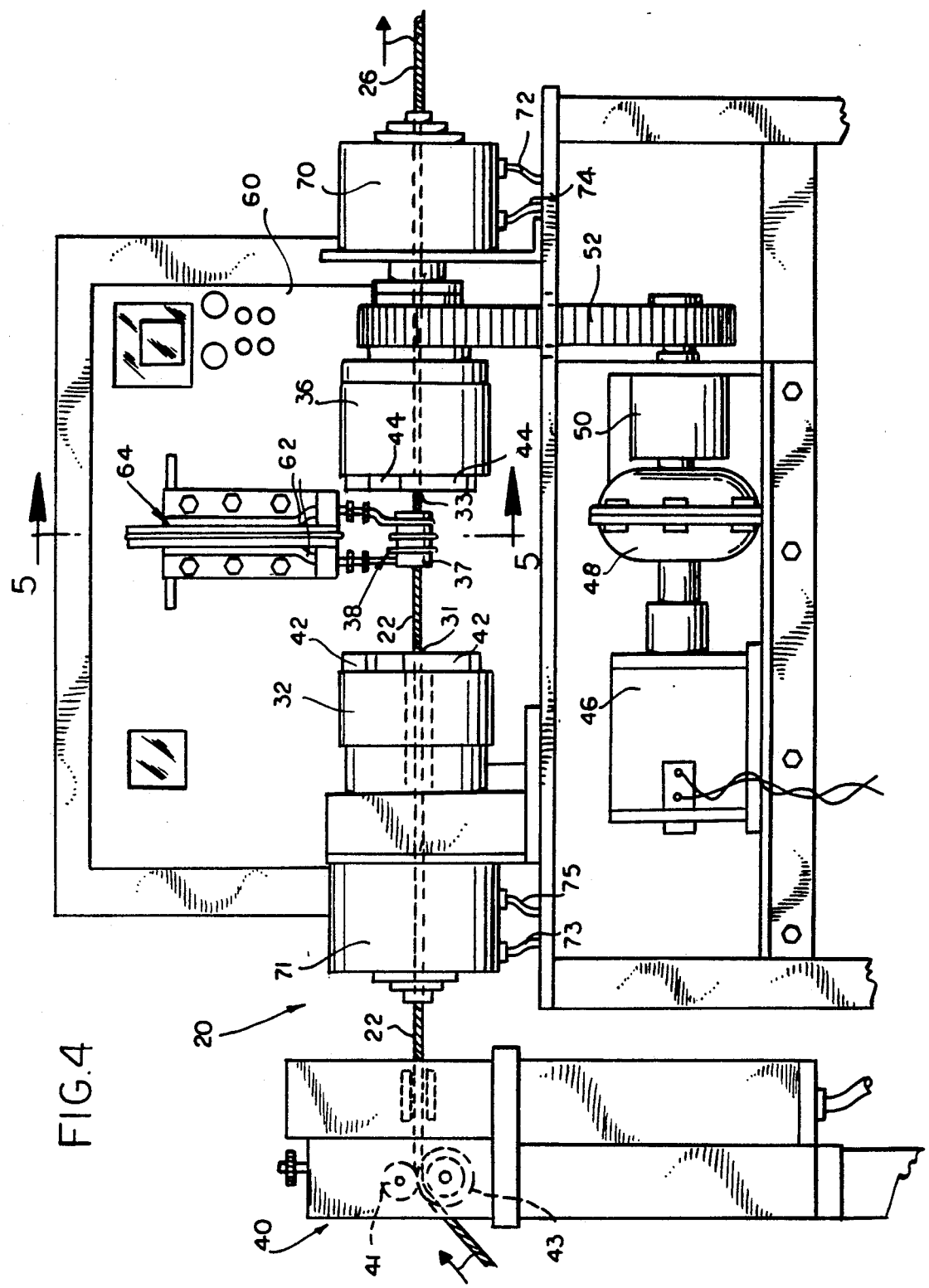

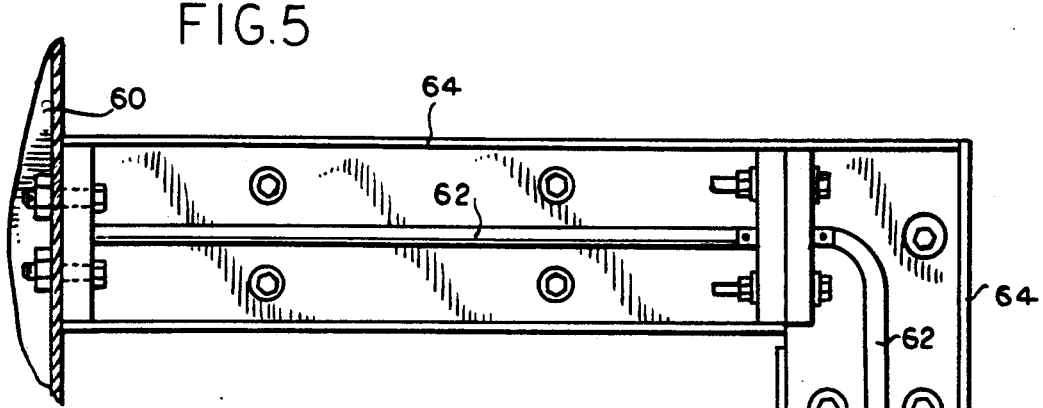
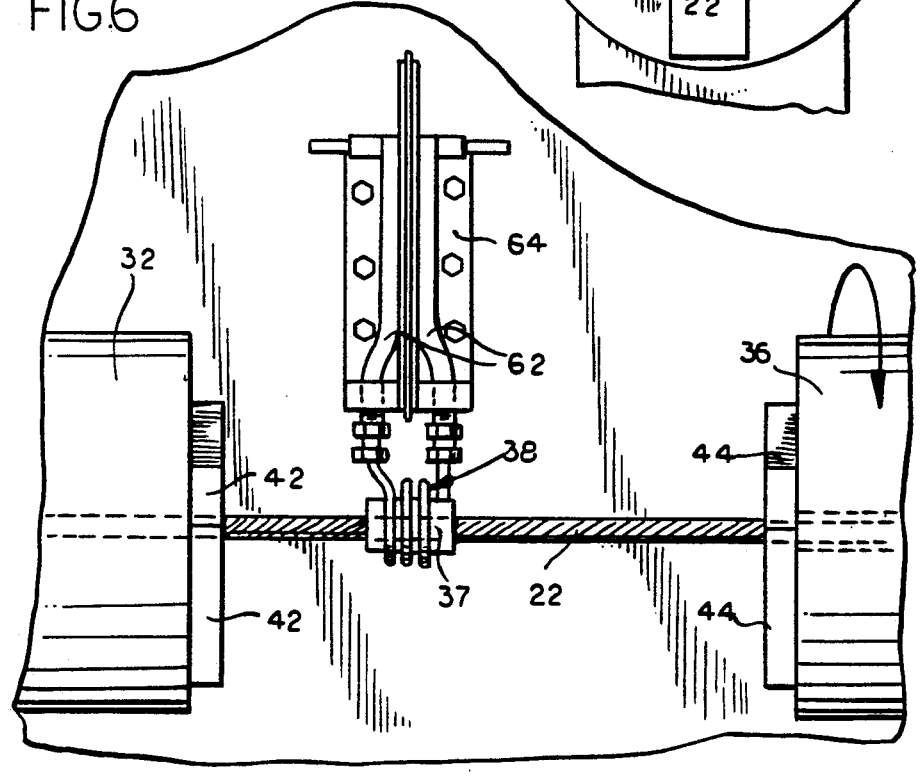

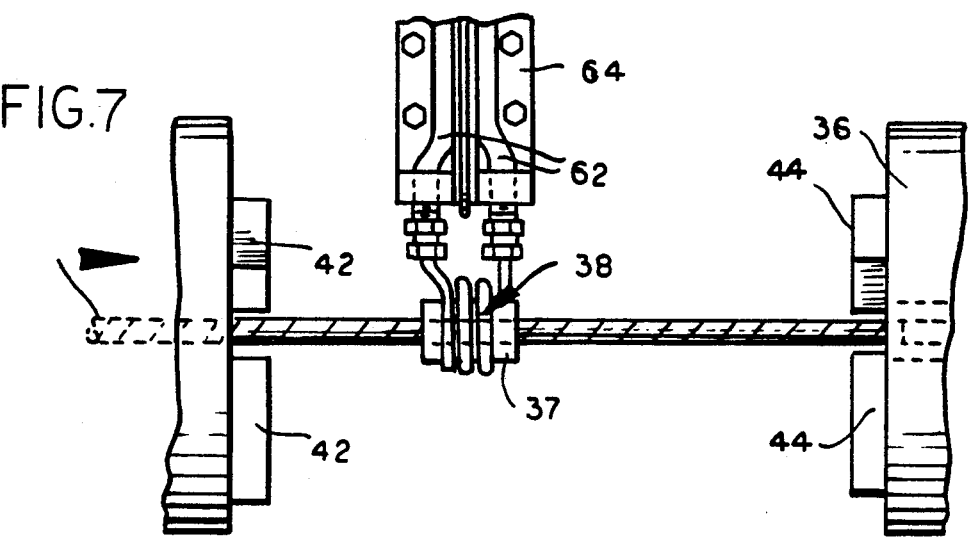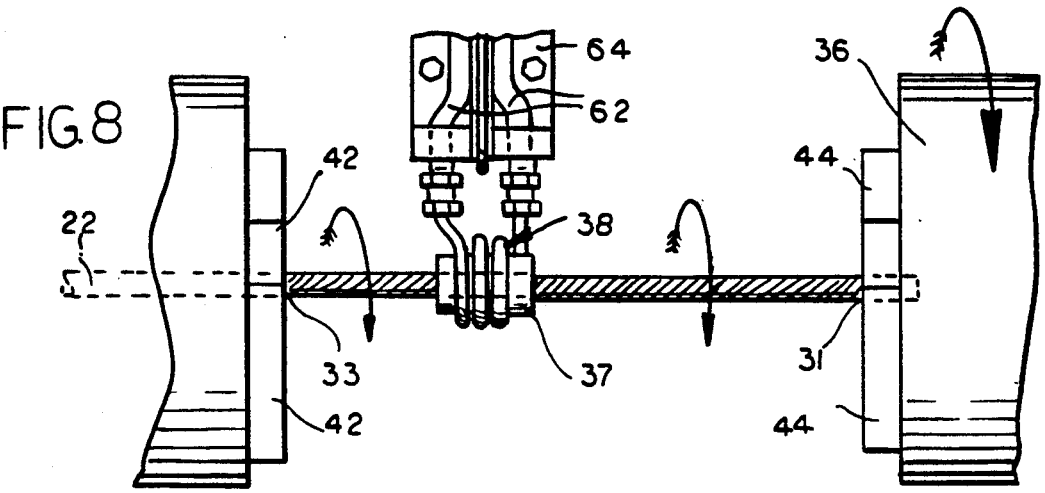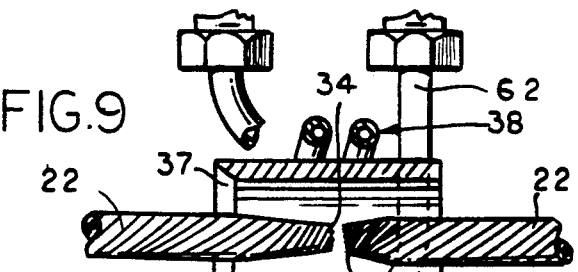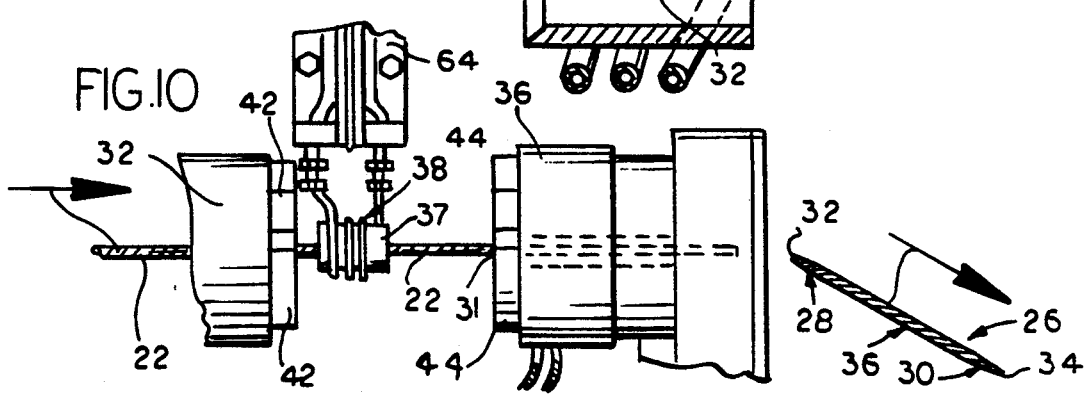

METHOD AND APPARATUS FOR FORMING CONVEYOR BELT HINGE PINS

FIELD OF THE INVENTION

The present invention relates to forming hinge pins used for coupling hinged belt fasteners which are attached to the adjacent ends of a conveyor belt.

BACKGROUND OF THE INVENTION

Conveyor belts are well known as an efficient means for conveying materials or products, and have found widespread use in a variety of applications and environments. In many operations, the conveyor belt is repeatedly flexed during each conveyor cycle. The belt flexes between an upturned, trough-shaped configuration which the belt attains while transporting material above the advancing rollers to prevent spillage of material over the side of the conveyor, and a flat configuration which the belt attains during its return path on the underside of the rollers. In such conveyors, the hinge pin will also be flexed and straightened repeatedly into and from a trough-like configuration.

To accommodate the heavy loads that may be encountered in industrial conveyor belt applications and the large forces that are transmitted through the conveyor belt, it is often necessary to join the ends of the conveyor belt by hinged belt fasteners rather than weaker means, such as sewing or bonding. This usually includes a strip of belt fasteners attached to each end of the conveyor belt and held together by a hinge pin, which is threaded through interleaved U-shaped portions of the adjacent belt fasteners to extend the width of the conveyor belt.

Present designs usually incorporate a length of cable formed of wire strands, which provides increased flexibility over a solid metal pin to allow the conveyor belt to conform to the shape of a trough where the belt ends are joined. Hinge pin failure, which disables the conveyor belt, is very costly in terms of downtime of the overall operation or process.

Merely cutting a long cable into shorter sections produces hinge pins having frayed ends or ends which will readily fray upon usage. The frayed ends make it difficult to thread the hinge pin through the overlapping hoops of adjacent belt fasteners. Also, the frayed hinge pin ends result in an increased rate of wear of the belt in the region of the hinge pin ends. With the aforementioned flexing which the hinge pins experience, and the heavy loads often required to be transported by the belt and hence borne by the hinge pins, the hinge pin ends become increasingly frayed during their lifespan, which further increases the rate of wear of the belt at the hinge pin ends.

One current method for reducing the fray of the hinge pin ends provides for dipping the ends of the hinge pin in a braze following cutting. Since the braze only reaches the exterior strands of the hinge pin, the interior strands are not bonded and thus the hinge pin still has a tendency to fray after prolonged use. Additionally, the braze dipping adds additional thickness to the ends of the hinge pin which makes it more difficult to thread the hinge pin through the overlapping belt fastener hoops. Moreover, the separate cutting and dipping operations are time consuming, with the increased operator time resulting in increased production costs.

It is desired to provide a method for sectioning an elongated length of cable into a plurality of shorter hinge pins which forms the separate hinge pins in such a manner that the hinge pins lend themselves to use with overlapping hoop-type belt fasteners of conveyor belts, particularly so as to facilitate easy threading of the hinge pins through the belt fastener hoops and prevent fraying of the hinge pin ends during usage which might reduce belt life.

SUMMARY OF THE INVENTION

In accordance with the present invention, the ends of the hinge pin are formed with a very tight spiral of a reduced diameter to provide a lead-in or thread portion with the strands welded together under high heat and pressure over a substantial length thereof in proximity with the ends. The welding takes place internally as well as externally, unlike a dipped braze where the braze metal may not reach the interior cable strands.

The process is faster than cutting and dipping in a braze in that the forming of the separate discrete hinge pins and the welding thereof occurs simultaneously by twisting the cable and heating the area at which the cable severs when the torque is sufficiently high and the cable strands are heated to soften them.

In accordance with one embodiment, the invention is carried out by gripping a length of cable at a first position therealong, gripping the cable at a second position therealong, and simultaneously both heating the cable by induction heating intermediate of the first and second gripping locations, and twisting the cable by rotating the portions of cable at the first and second gripping locations relative to one another, with the heat and twisting sufficient to sever the cable.

BRIEF DESCRIPTION OF THE DRAWINGS

In the drawings, wherein like elements are referenced alike:

FIG. 4 is a front elevational view of the apparatus of FIG. 1;

FIG. 5 is an enlarged, fragmentary cross-sectional view of the apparatus taken along line 5—5 of FIG. 4;

FIG. 6 is an enlarged, fragmentary elevational view of the central portion of the apparatus of FIG. 4;

FIG. 7 is an enlarged, fragmentary elevational view of the central portion of the apparatus of FIG. 4 showing a length of cable being advanced into the apparatus;

FIG. 8 is a view of the central portion of the apparatus of FIG. 7, showing the clamping and rotation of the cable;

FIG. 9 is an enlarged, fragmentary cross-sectional view of the central apparatus portion of FIG. 7 showing the severing of the cable;

FIG. 10 is a reduced, fragmentary view of the central apparatus portion of FIG. 7 showing a formed hinge pin being displaced by the advancing of a new length of cable into the apparatus;

DETAILED DESCRIPTION OF THE PREFERRED EMBODIMENTS

Figure 1:
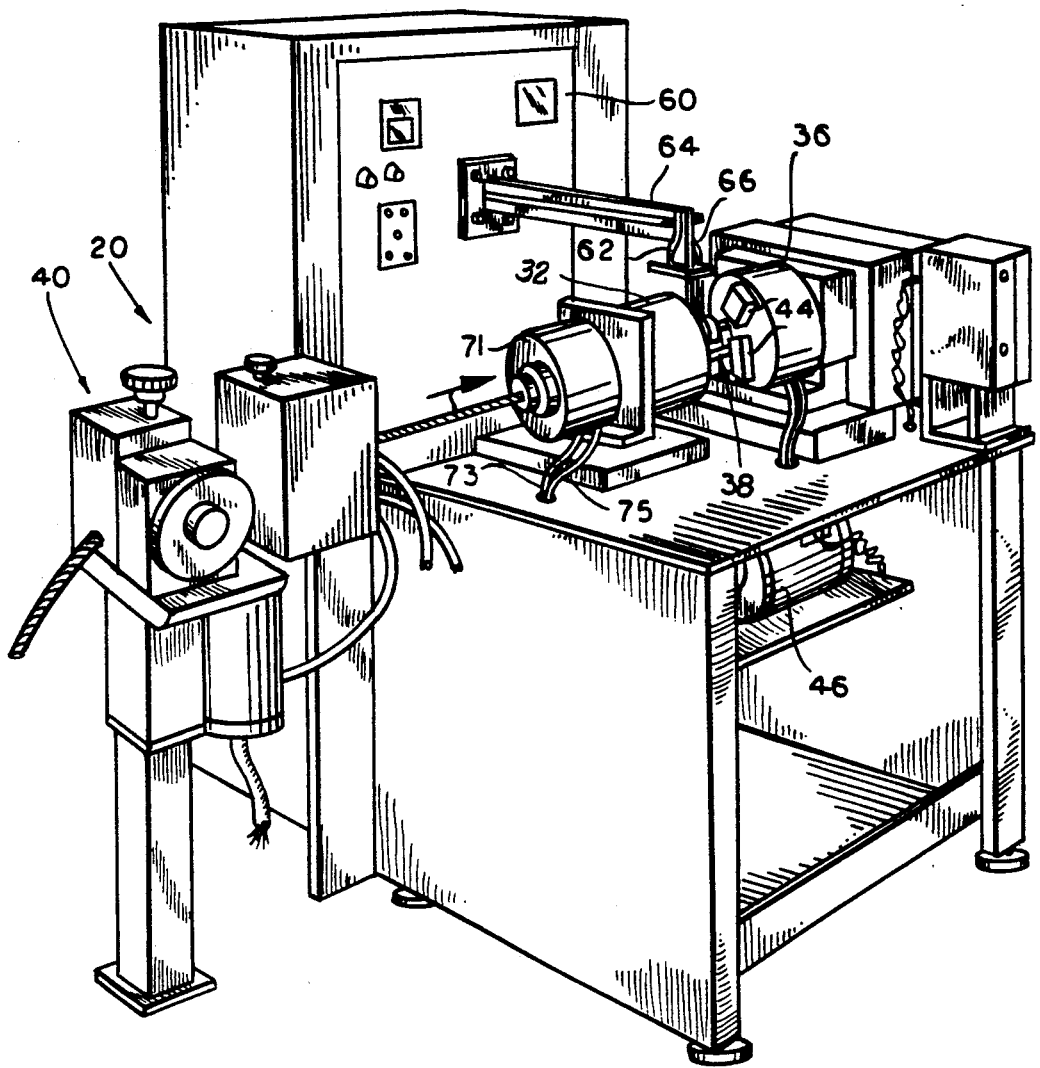
FIG. 1 is a perspective view of an apparatus embodying various features of the present invention.

An apparatus for carrying out the invention is shown in FIGS. 1 and 4–10, and referred to generally by reference numeral 20. The apparatus is used to form hinge pins 26, such as that shown in FIG. 3, from a length of cable 22 such as that shown in FIG. 2.

Figure 2:
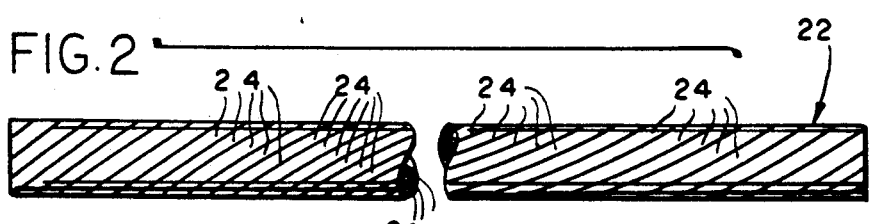
FIG. 2 is an elevational view of a representative length of cable suitable for carrying out the present invention.

In accordance with the invention, a length of cable 22 having a plurality of spirally wound strands 24, as illustrated in FIG. 2, is twisted and heated sufficiently that the cable 22 severs under the applied heat and pressure. This heating and twisting is repeated at spaced intervals along the length of the cable 22 to section the elongated length of cable into shorter hinge pins 26 such as that illustrated in FIG. 3.

Figure 3:
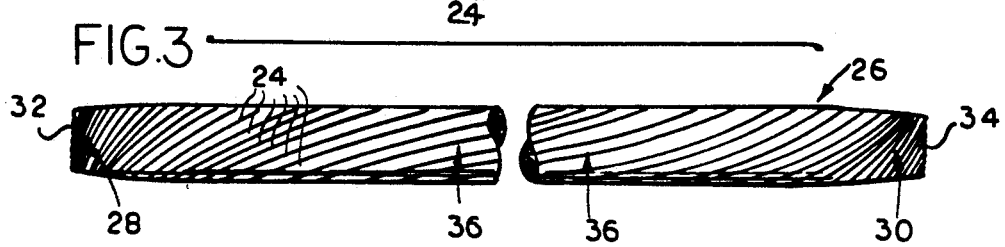
FIG. 3 is an elevational view of a representative hinge pin embodying various features of the present invention.

With reference to FIG. 3, hinge pins 26 produced in accordance with the present invention have a very tight spiral of reduced diameter in the end regions 28 and 30 near the ends 32 and 34, with a less tight spiral in the region 36 in between the end regions 28 and 30. The tightness of the spiral in the end regions results in a reduced diameter at the ends 32 and 34, which reduced diameter facilitates threading or passing of the hinge pin 26 through the loops of overlapping belt fasteners.

The tight spiralling in the end regions 28 and 30 is effected by twisting or torquing the cable 22 thereat. Heat is also imparted to the cable 22 in the end regions 28 and 30 such that the combination of the heat and twisting to the cable 22 in the end regions 28 and 30 is sufficient to bond the cable strands 24 together in the end regions. The bonding is sufficient to maintain the tightly wound spiral at the end regions 28 and 30, and also serves to prevent fraying of the ends 32 and 34 of the hinge pin 26. The cable 22 is preferably heated by induction heating or the like, so that the internal strands 24 are bonded as well as the external strands 24.

While the invention is described with reference to a cable 22 having a plurality of generally uniform strands 24 wound spirally in a common direction, it will be noted that the invention lends itself to utilization with a wide variety of other cable configurations as well. For instance, the invention has been carried out with double spiral windings wherein internal strands spiral in a first direction and external strands spiral thereabout in an opposite direction, and the invention has also been carried out with cables having an interior spiral winding with an exterior metallic ribbon or armor wound thereabout. These examples are meant to be illustrative only, and not limiting, as the invention lends itself to employment with a very wide variety of cable designs.

With reference to FIGS. 1 and 4, the preferred apparatus 20 for carrying out the invention is illustrated. A length of cable 22 is advanced into the apparatus 20 whereupon the cable 22 is gripped at a first longitudinal position 31 therealong by a stationary chuck 32, and also gripped at a second longitudinal position 33 therealong by a rotary chuck 36. Upon rotation of the rotary chuck 36, preferably in the direction of the spiralling strands, a torque is imposed in the cable 22 over the length thereof between the first gripping position 31 and the second gripping position 33.

Situated between the stationary chuck 32 and the rotary chuck 36 is a heating means which is preferably in the form of an induction heating coil through which a portion of the cable 22 intermediate of the first and second gripping positions 30 and 34 extends. A cylindrical ceramic shield 37 is secured within the induction heating coil 38 which serves as an insulator to prevent the cable 22 from contacting the coil 38. Sufficient heat is induced in the cable 22 at the induction heating coil 38, together with the aforementioned inducement of sufficient torque in the cable 22 thereat, to sever the cable 22 at the induction coil 38 whereat the cable is heated.

Manifestly, alternative apparatus may provide for either maintaining one section of the cable 22 stationary while another section is rotated; rotating the cable in opposite directions at two different locations along the length of the cable; or rotating the cable in the same direction at two locations therealong at different rotating speeds, and hence the invention should not be limited to the particular apparatus illustrated.

As described in greater detail below, the stationary chuck 32 and rotary chuck 36 both have respective clamping jaws 42 and 44 which are moveable radially between an open position, in which the jaws are moved radially outward to allow free passage of the cable 22 therethrough, and a closed position, in which the jaws 42 and 44 move radially inward to securely clamp the cable 22.

A cable feeding means 40 advances the cable 22 a predetermined length into the apparatus 20 while the stationary chuck 32 and rotary chuck 26 both have their clamping jaws 42 and 44 moved to their open position. (see FIG. 7) Hence, upon advancement into the apparatus 20, the cable 22 extends through the stationary chuck 32, through the induction heating coil loops 38 and through the rotary chuck 36. A wide variety of cable feeding means are known in the art, and in the illustrated embodiment the cable is pressed between two adjacent channelled driving wheels 41 and 43 which rotate to advance the cable 22. Preferably, the cable is taken from a coil of cable mounted in a cable reel device (not shown) of conventional manufacture. The wire from the coil may be passed through a conventional wire straightener device (not shown).

After the cable 22 has been advanced a predetermined length, which length corresponds to the desired length for the hinge pins 26, the clamping jaws 42 and 44 of the stationary chuck 32 and the rotary chuck 36 are moved to their closed positions to clamp the cable at the first longitudinal position 31 therealong and the second longitudinal position 33 therealong. (see FIG. 8) Thereafter, the clamping jaws 44 of the rotary chuck 36 are rotated while the clamping jaws 42 of the stationary chuck 32 remain stationary. This twists the cable 22 about its axis and induces a torque in the cable 22 over those portions thereof situated between the stationary chuck 32 and the rotary chuck 36.

Simultaneous with the imposition of torque to that portion of the cable 22 situated intermediate of the first and second gripping positions 30 and 34, the induction coil 38 is actuated to induce heat in the cable 22 over a portion of the torqued portion of the cable. The heat input and torque requirements will vary depending upon the size, configuration, materials and the like of the particular cable to be sectioned. The heat is sufficient to heat the cable 22 to a deformable temperature so that the torque plastically deforms the cable strands 24.

To produce the desired tapering effect at the severing of the cable 22, the heat and torque imposed on the cable must be closely controlled. Too great of a torque results in the strands 24 of the cable 22 being stretched too rapidly to the point of snapping, which snapping prevents the strands 24 from being stretched more thinly as is necessary to produce the desired tapered regions 30. As stated above, the cable 22 becomes easier and easier to twist as it approaches severing. Employing a conventional electric motor drive with a constant rotational speed results in imposition of a high initial torque to the cable, which torque decreases as the cable is heated and twisted further. This is undesirable in that if a motor were selected having the proper rotational speed to impose the desired torque during the initial twisting stage, that motor would impose too low a torque in the cable during the final stages, in which the resistance to twisting is lessened, to effect the desired stretching of the cable strands 24.

Contrarily, if a motor were selected having a rotational speed which imposes the desired torque to the cable during the final stages prior to severing, that motor would not impose sufficient torque to the cable during the initial stages.

To overcome this problem, it is desirable to provide an arrangement for imposing a constant torque to the cable 22 throughout the heating, twisting and severing of the cable.

With reference now to the illustration of the apparatus in FIG. 4, the rotary chuck 36 is driven by an electric motor 46, through a fluid coupler 48 which provides the desired constant torque, and through a reducing gear box 50. A belt 52 connects the output axis 54 of the gear box 50 to the rotary chuck 36 to drive the rotary chuck 36. Thus, despite the increased torsional flexibility of the cable 22 with time, the aforementioned fluid coupler arrangement maintains a constant torque in the cable to regulate the twisting speed. To maintain constant torque in the cable 22 as its torsional flexibility increases with the cable being softened by heating, the clamping jaws 44 of the rotary chuck 36 must rotate faster and faster in proportion to the increased torsional flexibility.

Upon the initiation of torquing and heating the cable 22, the torsional strength of the cable 22 prevents substantial rotation of the rotary chuck 36 despite the torque imposed on the cable by the rotary chuck 36. However, as the cable 22 is heated further, the strands 24 which comprise the cable 22 become increasingly deformable, with the rate of rotation of the rotary chuck 36 increasing as the cable 22 heats up and softens. Hence, the rate of twisting of the cable 22 in the heated area increases with time. The increased twisting in the heated end regions 28 and 30 increasingly shortens the corresponding length of the cable until finally the portions of cable on either side of the induction heating coil 38 pull in opposite directions, due to their shortening, sufficiently to sever the cable 22 at the heated region (see FIG. 9).

The severed ends 32 and 34 remain positioned immediately adjacent one another after severing and they continue to rotate relative to one another following severing, whereby the severed ends 32 and 34 rub against one another while still in their deformable state to begin to smooth out the severed ends. Hence, the severed ends 32 and 34 are generally flat, of reduced diameter, and without entirely frayed strand ends.

Figure 11:
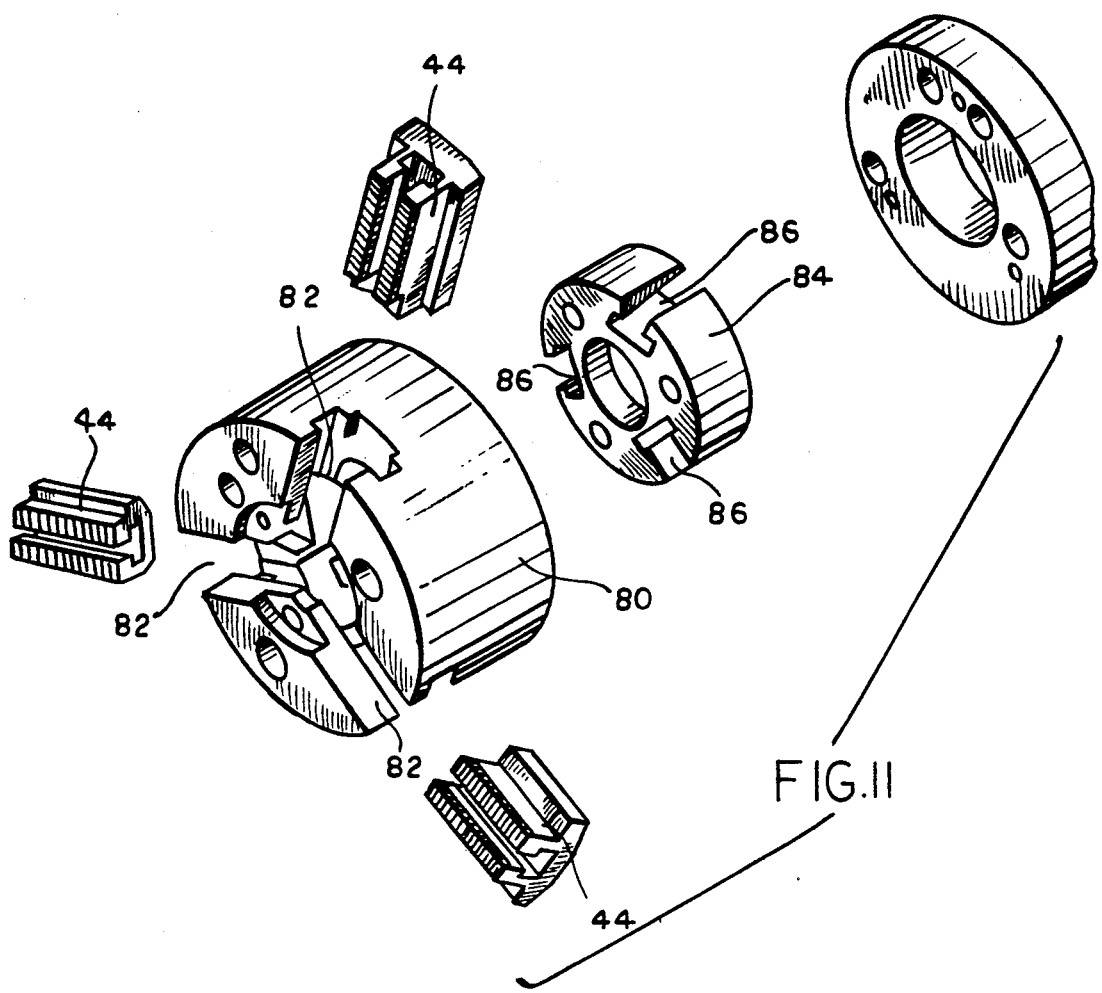
FIG. 11 is an enlarged exploded view of a portion of a rotary chuck suitable for carrying out the present invention.
Figure 12:
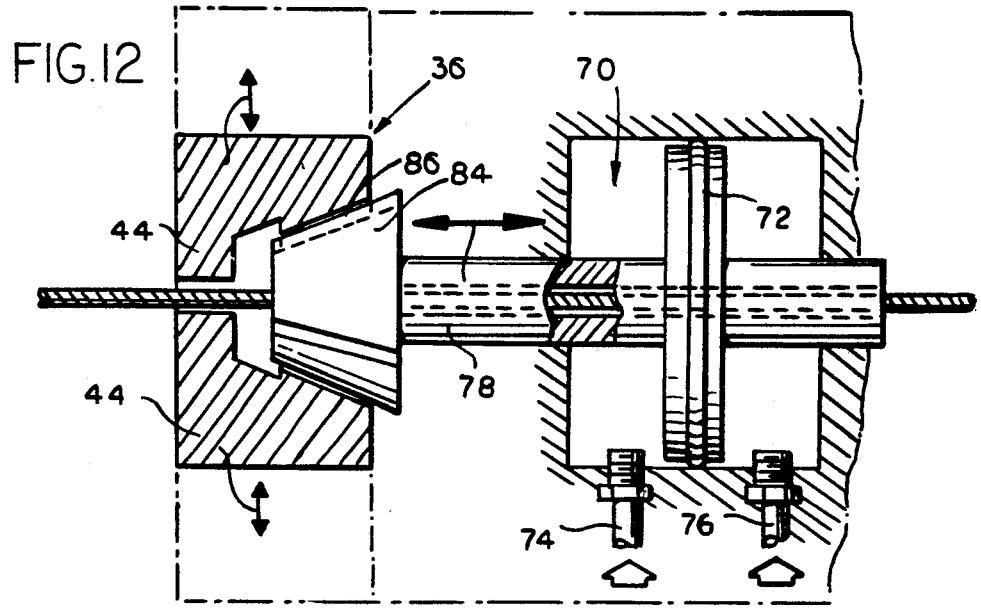
FIG. 12 is a schematic view of the rotary chuck and piston arrangement illustrating the clamping operation of the clamping jaws.

With reference to FIGS. 4, 11 and 12, the operation of the rotary chuck 36 discussed above will now be described. Rotary chucks are well known and any of a variety of such rotating chucks may be employed to carry out the present invention. In the illustrated chuck, the clamping jaws 44 of the rotary chuck 36 are moved radially inward to clamp the cable 22 and radially outward to release the cable 22 by piston cylinder 70 which is interconnected with the rotary chuck 36. As seen in FIG. 12, piston cylinder 70 includes a piston 72 therein which is pneumatically displaceable axially. Pneumatic lines 74 and 76 extend into the piston cylinder 70 on opposite sides of the piston 72, whereby introduction of air into the cylinder 70 through pneumatic line 74 displaces the piston 72 away from the rotary chuck 36, and alternatively, introduction of air into the cylinder 70 through pneumatic line 76 displaces the piston 72 toward the rotary chuck 36.

With continued reference to the schematic diagram of FIG. 12, the piston 72 is connected to tubular shaft 78 which is mounted for axial sliding such that the shaft 78 is moved axially toward and away from the rotary chuck 36 as the piston 72 is reciprocated. The shaft 78 extends into mounting jig 80 which houses the clamping jaws 44. As best seen in FIG. 11, the mounting jig 80 includes three radially extending channels 82, spaced approximately 120 apart from one another, in which the clamping jaws 44 reside and are free to slide radially inward and outward therein.

The mounting jig 80 has a large aperture therein proportioned to accommodate camming jig 84 for axial reciprocal movement therein. The shaft 78 is interconnected with the camming jig 84 so that the camming jig 84 is reciprocated axially together with the shaft 78 upon reciprocation of the piston 72. The camming jig 84 has three angled or cammed channels 86 which taper radially outward as best seen in FIG. 11, and are equally radially spaced so as to be in registration with the channels 82 of the mounting jig 80. The clamping jaws 44 extend into the cammed channels 86 of the camming jig 84 and are retained therein by a tongue-in-groove arrangement. With this arrangement, axial movement of the camming jig 84 effects radial movement of the clamping jaws 44.

As best seen in FIG. 12, as air is introduced into the piston cylinder 70 through pneumatic line 76, the piston 72 is displaced toward the rotary jig 36 thereby displacing the shaft 78 and camming jig 84 axially to the left, as viewed in the drawings. The clamping jaws 44 bear against the walls of the tapered channels 86 as the camming jig 84 reciprocates axially whereby the clamping jaws 44 are moved radially outward. With the clamping jaws 44 moved radially outward, there is an open aperture in the rotary jig 36 through which the cable 22 can freely pass. As discussed above, the clamping jaws 44 are retained in their radially outward position during advancements of the cable 22, and then moved radially inward to clamp the cable 22 during the torquing and heating.

To move the clamping jaws 44 radially inward, air is introduced into the piston cylinder 70 through pneumatic line 74. This displaces the piston 72 axially away from the rotary chuck 36, and thus displaces the shaft 78 and camming jig 84 axially in the same direction. The tongue-in-groove engagement of the clamping jaws 44 within the tapered channels 86 effects the desired radially inward movement of the clamping jaws 44 as the camming jig 84 is moved to the right. This arrangement provides sufficient clamping of the cable 22 by the clamping jaws 44 and also allows for rotation of the clamping portion of the rotary chuck 36 such that the section of cable 22 clamped thereby rotates with the chuck 36, substantially free of slippage.

With reference to FIG. 4, The rotary jig 36 is driven by belt 52 to rotate the mounting jig 80 and camming jig 84 as the cable 22 is clamped thereby. The actuation of the pneumatic lines 74 and 76 may be automated or manual, but preferably the entire operation is automated to maximize production and minimize production costs.

The stationary chuck 32 has its clamping jaws 42 moved radially inward and outward, in a manner similar to that of the rotary chuck 36 described above, through interconnection of the stationary chuck 32 with piston cylinder 71. A piston in piston cylinder 71 is displaced and reciprocated axially upon introduction of air through pneumatic lines 73 and 75, which respectively effect opening and closing of clamping jaws 42.

Different microstructural bonding mechanisms come into play with the present invention, depending upon the material of the cable employed. For instance, with galvanized wire, the heating and twisting brazes the strands 24 of the cable 22 together. Under the applied heat and pressure, zinc combines with some of the iron to create a zinc-iron braze which bonds the strands 24. With stainless steel cable, although it looks almost identical to the galvanized cable there is no zinc coating, and the mechanism by which the stainless steel strands 24 are bonded together is by solid phase joining.

In accordance with one embodiment for carrying out the invention, the operation is automated. A control means in the form of a conventional automated controller includes a control panel 60 and the control means is employed to sequence the various operations. Initially, the control means triggers the cable feeding device 40 to advance a predetermined length of cable 22 into the apparatus. The control means then actuates the pneumatic lines 74 and 75 to move the clamping jaws 42 and 44 of both the stationary and rotary chucks radially inward to clamp the cable 22 at respective first and second longitudinal clamping positions 31 and 33. Immediately thereafter, the control means generally simultaneously actuates the electric motor 46 to apply torque to the cable 22 through the rotary chuck 36, and actuates the electrical power supply to the induction heating coil 38 to begin heating the cable 22 thereat. The cable 22 is heated and twisted for a predetermined period sufficient to sever the cable 22. After the predetermined period has elapsed, the control means interrupts the supply of electrical power to both the electric motor 46 and the electrical induction heating coil 38 to halt the twisting and heating of the cable. Then the control means actuates pneumatic lines 73 and 72 to move the clamping jaws 42 and 44 of the stationary and rotary chucks 32 and 36 to their open positions to unclamp the cable 22. With reference to the orientation of FIG. 4, a short sectioned hinge pin 26 will be situated to the left of the induction heating coil 38, and an elongated length of cable 22 will be situated to the right of the induction heating coil 38. The control means then again actuates the cable feeding device 40 to again advance a predetermined length of cable 22 into the apparatus 20. The advancing elongated cable 22 abuts the newly formed hinge pin 26 as it advances into the apparatus and displaces the newly formed hinge pin 26 by pushing it out of the apparatus 20. The controller then repeats the cycle by actuating clamping of the clamping jaws 42 and 44, and the like. Accordingly, by programming the controller to repeat this procedure over and over, pivot pins 26 can be produced from a length of cable 22 in rapid succession with low production cost.

The wire 62 leading to the induction heating coil 38 extends outward, generally perpendicularly, from the control panel 60 so as to space the induction heating coil 38 from the control panel 60. The wire 62 is preferably square copper tubing having water circulating therethrough to dissipate heat. Further heat dissipation of the wire 62 is attained by brazing the wire 62 to buswork 64, whereby the buswork 64 serves as a heat sink. The wires 62 are preferably brazed to the buswork 64 along their entire length. This tubing arrangement minimizes power loss while maximizing heat dissipation. The buswork 64 is insulated, such as by covering the buswork with a layer of rubber, to prevent shock to the user upon inadvertent grounded contact with the buswork.

The buswork 64 is mounted to and extends generally perpendicularly from the control panel 60. The buswork 64 is preferably formed of two plates secured together and having a thin layer of Teflon or other suitable insulator therebetween. Near the terminal end 66 of the buswork 64 the induction heating wire 62 turns downward and extends beyond the buswork 64. The wires 62 are preferably bonded to the buswork 64 at their inlet and exit by a watertight braze to prevent water leakage. Immediately below the buswork 64 the wire 62 is looped to form the induction heating coil 38. It is preferred that the induction heating coil 38 be coated with a suitable epoxy to prevent arcing on the wire 62 and reduce the shock hazard. The epoxy coating also serves to minimize oxidation of the coil.

The high temperatures realized in the cable 22 due to the induction heating, and the exposure of the exterior portions of the cable to the oxygen of the air often results in the formation of metal oxides on the exterior portions of the cable. While gas suppression techniques may be employed to eliminate the oxide formation, this is costly. It is preferred that the thin layer of oxide be removed by lower cost mechanical methods such as particulate abrasion.

By way of example only, the recommended operating parameters are to have a power setting of about 0.3 to 0.4 amps at 200 volts A.C. for the induction heater and to apply the heat for a period in the range of 6 to 27 seconds. The torque range applied is about 6 to 12 ft-lbs. in this illustrated embodiment of the invention.

The heating and twisting method of the present invention and the apparatus for carrying this out thus section a length of cable 22 into shorter hinge pins 26 which have the desirable characteristics of tapered ends to facilitate easy threading of the hinge pin 26 through overlapping hoops of belt fasteners, and solidly fused cable strands in the region of the tapered ends to prevent fraying of the ends. The method of the present invention eliminates the need for a separate production step to add an end cap or end weldment following sectioning of the cable.

What is claimed is:

1. Apparatus for forming a plurality of hinge pins for joining conveyor belt ends from an elongated wire cable formed of a plurality of spirally twisted wire strands and having a longitudinally extending axis, the apparatus comprising:
   first gripping means for gripping a first portion of the cable at a first longitudinal position therealong;
   second gripping means for gripping a second portion of the cable at a second longitudinal position therealong;

induction heating means for induction heating a third portion of the cable at a third longitudinal position therealong to a deformable temperature, the third longitudinal position being between and spaced from the first and second longitudinal positions; and means for rotating said first and second gripping means relative to one another about said longitudinal axis with sufficient torque to cause the cable strands to reduce substantially in diameter and to autogenously weld to each other at the heated portion and to sever the cable at the heated third longitudinal position therealong.

2. An apparatus in accordance with claim 1 wherein said means for rotating said first and second cable portions relative to one another comprises a constant torque means for applying a constant torque to the cable prior to and during severing, said rotatable gripping means rotating faster and faster as the cable strands soften.

3. Apparatus for forming a plurality of hinge pins for joining conveyor belt ends from an elongated wire cable formed of a plurality of spirally twisted wire strands and having a longitudinally extending axis, the apparatus comprising:

first gripping means for gripping a first portion of the cable at a first longitudinal position therealong;

second gripping means for gripping a second portion of the cable at a second longitudinal position therealong;

heating means for induction heating a third portion of the cable at a third longitudinal position therealong, between the first and second longitudinal positions; and means for rotating said first and second gripping means relative to one another about said longitudinal axis with sufficient torque, while maintaining a generally constant spacing between the first and second gripping means, to cause the cable strands to reduce substantially in diameter and to autogenously weld to each other at the heated portion and to sever the cable at the heated third longitudinal position therealong; and the means for rotating turns the rotatable gripping means such that the torque applied to the cable is in proportion to the heat applied thereto.

4. An apparatus in accordance with claim 1 further including cable advancing means for advancing a length of cable to said first and second gripping means.

5. An apparatus in accordance with claim 4 in which a control means causes the cable advancing means and first and second gripping means and the rotating means to be operated in proper sequence to make a succession of hinge pins from a single long length of cable.

6. An apparatus for sectioning cable having a longitudinal axis, the apparatus comprising:

a stationary chuck having gripping means for gripping the cable at a first longitudinal position therealong;

a rotatable chuck having gripping means for gripping the cable at a second longitudinal position therealong and rotating the cable about the longitudinal axis at the second longitudinal position without longitudinal movement of the rotatable chuck;

means for advancing a length of cable to bring a first portion thereof into said stationary chuck and a second portion thereof into said rotatable chuck; and heating means for heating the cable to a deformable temperature at a longitudinal position between said first and second longitudinal positions, simultaneous with the cable rotation, with the heating and rotating of the cable effecting severing thereof.

7. An apparatus in accordance with claim 6 wherein said means for advancing a length of cable into the first and second chucks pushes a previously sectioned portion of the cable from the chucks.

8. An apparatus for forming a plurality of hinge pins for joining conveyor belt ends from an elongated wire cable formed of a plurality of spirally twisted wire strands and having a longitudinally extending axis, the apparatus comprising:

a stationary chuck for receiving a first portion of the cable therein, the stationary chuck having clamping means selectively moveable between an open position to allow free passage of the cable through the stationary chuck, and a closed position to tightly clamp the first portion of cable;

a rotary chuck for receiving a second portion of the cable therein, the rotary chuck having rotary clamping means selectively moveable between an open position to allow free passage of the cable through the rotary chuck, and a closed position to tightly clamp the second portion of the cable;

heating means for heating a third portion of the cable, intermediate of said first and second cable portions, to a deformable temperature; and said rotary chuck having means for rotating said rotary clamping means when in their closed position to twist the cable thereat about its longitudinal axis and induce sufficient torque in the portion of cable in proximity with the heating means, without longitudinal translation of the cable thereat, to cause the cable to reduce substantially in diameter and the cable strands to weld together at the heated portion, and the cable to sever at the heated portion.

9. An apparatus in accordance with claim 8 wherein said clamping means are actuated pneumatically to move between their open and closed positions.

10. An apparatus in accordance with claim 8 wherein said clamping means move radially inward to said closed position and radially outward to said open position.

11. A method for forming a plurality of hinge pins for joining conveyor belt ends from an elongated wire cable formed of a plurality of spirally twisted strands and having a longitudinally extending axis, the method comprising the steps of:

securing the cable in a stationary position at a first longitudinal position therealong;

gripping the cable at a second longitudinal position therealong;

heating the cable to a deformable temperature at a third longitudinal position therealong, intermediate of said first longitudinal position and said second longitudinal position;

applying sufficient torque to the length of cable intermediate the secured and gripped portions by twisting the cable thereat without application of longitudinal force to the cable to reduce the diameter of the cable at the heated portion with the strands being wound into a tighter spiral and welded to each other; and severing the cable by the twisting torque at the heated portion to form reduced diameter ends of adjacent hinge pins with the strands being more tightly wound and spiralled together at the ends of the hinge pin.

12. The method of claim 11 further including the steps of:
automatically feeding the cable forwardly and automatically repeating the steps of securing, gripping, heating and applying torque to form a second end for the hinge pin.

13. The method of claim 12 further including the step of:
automatically feeding the cable forwardly and again automatically repeating the steps of securing, gripping, heating and applying torque to the cable, with the forward feeding of the cable displacing the severed hinge pin.

14. A hinge pin formed by the method of claim 11.

* * * * *